May 3, 1949.
P. J. OVREBO
2,468,775
IMPEDANCE MATCHED THERMOCOUPLE FOR
COAXIAL CONDUCTORS
Filed Oct. 25, 1944
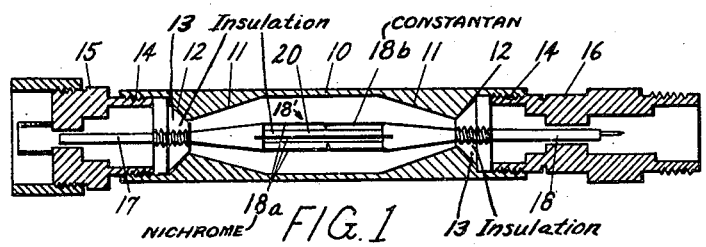
FIG. 1
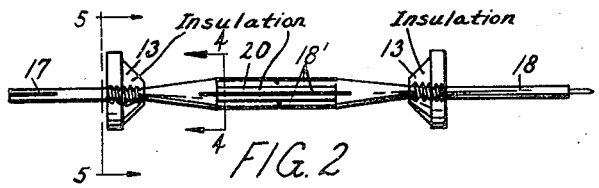
FIG. 2
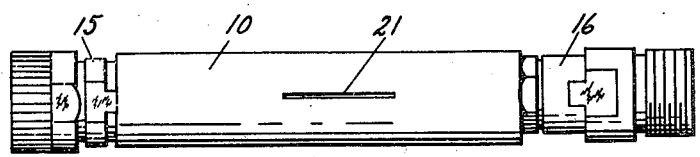
FIG. 3
FIG. 4
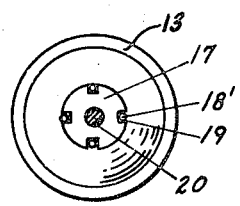
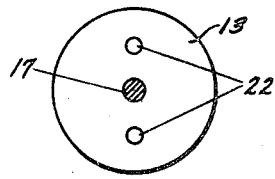
FIG. 5
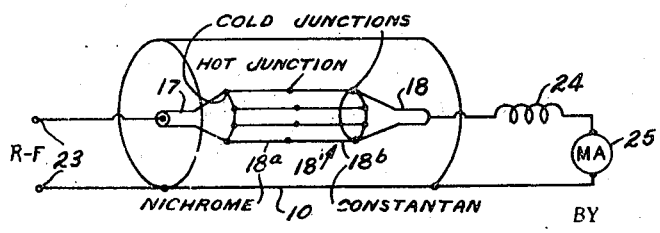
FIG. 6
INVENTOR.
PAUL J. OVREBO
BY William D. Hall
ATTORNEY Patented May 3, 1949

2,468,775

UNITED STATES PATENT OFFICE 2,468,775

IMPEDANCE MATCHED THERMOCOUPLE FOR COAXIAL CONDUCTORS

Paul J. Ovrebo, Dayton, Ohio

Application October 25, 1944, Serial No. 560,293

2 Claims. (Cl. 136—4)

(Granted under the act of March 3, 1883, as amended April 30, 1928; 370 O. G. 757)

The present invention relates to thermocouples used in making radio frequency measurements of power, voltage, current and associated phenomena, such as standing wave ratio, phase relationship, and frequency determinations under a condition where the thermocouple element forms the center conductor of a portion of the length of a coaxial line of a specified, desired impedance.

An object is to provide a thermocouple assembly which will present a correct impedance to the coaxial line in which it is placed, and thus eliminate the presence of a serious discontinuity which sets up an unfavorable high standing wave ratio.

Another object is to provide a thermocouple which will have high sensitivity to small as well as large radio frequency currents flowing in the conductor.

Another object is to provide a thermocouple which will function satisfactorily at very high radio frequencies as well as at lower radio frequencies extending down into the audio range.

These and other objects will appear throughout the specification and will be pointed out in the claims.

When a single thermocouple element is used as the center conductor of the thermocouple assembly in a coaxial line, the ratio between the diameter of the outer conductor and inner conductor becomes very large and the impedance value becomes excessively large and presents a serious discontinuity at the high radio frequencies; that is, if a single thermocouple element is made of wires of sufficiently large diameter to set up a proper diameter ratio such as of 2.3 to 1 for an impedance of 50 ohms when air is the dielectric between the outer and inner conductors of the coaxial line, the thermocouple element becomes large in mass and materially reduces its sensitivity to small radio frequency currents.

In the present invention, a plurality of thermocouple elements are used and each thermocouple element consists of resistance wires of dissimilar thermo-electric power rendering the element sensitive to the passage of small radio frequency currents. Passage of a radio frequency current through the element generates heat due to the fact that the element consists of resistance wires. The temperature of the junction of these resistance wires will be higher than the temperature of the junctions between the resistance wires and the regular central conductor of the coaxial line, due to the fact that heat will be conducted along the wire, away from the junction. This difference in temperature sets up a D. C. electromotive force which, in turn, produces a small D. C. current which flows in the circuit and is detected by a sensitive D. C. milliammeter or micropammeter.

This new design places a number of axially aligned thermocouple elements between two rings, so arranged that the contour of the figure simulates a cylinder, thus presenting a virtual inner conductor whose composite diameter bears the proper ratio to the diameter of the outside conductor of the coaxial line. This design will increase the usable frequency range of the thermocouple assembly, and will have adequate sensitivity at high radio frequencies for low and high power since the current indication increases with frequency. Consequently, it is possible to preserve the desired impedance and adequate sensitivity of the thermocouple assembly at the high radio frequencies.

In the drawing,

Figure 1 is a transverse cross-sectional view of the thermocouple equipped with male and female coaxial line fittings at its opposite ends.

Figure 2 is a vertical elevation of the center thermocouple conductor assembly removed from the outer conductor.

Figure 3 is a vertical elevation of the thermocouple unit sectionally shown in Figure 1.

Figure 4 is a cross-sectional view of the inner conductor taken on the line 4—4 of Figure 2, and illustrating the radial placement of the ends of the thermocouple wires to form a cylindrical pattern.

Figure 5 is a vertical elevation taken on line 5—5 of Figure 2 and showing the opposite side of the insulating spacer plug shown in Figure 4.

Figure 6 is a schematic circuit diagram of the electrical arrangement of the thermocouple in connection with an indicator. The coupling or connection 23 to the R. F. source may be effected by a pickup coil, as shown in U. S. Patent 2,443,637 granted to me on June 22, 1948. In Fig. 6 the direct-current path is completed through outer conductor 10, R. F. source connection 23, and contact 17 to the hot junction 18'.

Referring to the drawing wherein like numerals denote like parts, the thermocouple comprises, in its preferred form, an outer metallic conductor or tubular element 10, tapered inwardly and outwardly so as to form a converging tapered bore 11 and a diverging tapered bore 12 at its opposite ends. The converging tapered portions 11 serve to follow electrically the tapered contours of the center conductor, while the diverging tapered portions 12 serve as shoulders for centering the polystyrene insulating spacer plugs 13 fitted to the center conductor. Threaded portions 14 at the inner extremities of outer conductor 10 serve to threadedly engage standard coaxial line couplers 15 and 16.

The center conductor assembly is illustrated as comprising a pair of oppositely tapered female and male contact members 17 and 18, on which the spacer plugs 13 are threadedly retained. These contact members, in assembled form, are physically spaced from each other and arranged so that their larger tapered portions face one another, thereby resembling a drawn-out cylinder when the thermocouple wires 18' are soldered in place in notches 19 around the tapered peripheries of these tapered portions. Axially of the contact members 17 and 18, and centrally disposed with respect to the thermocouple wires 18', is an insulating rod 20 which is forced into axial bores of said members 17 and 18 so as to strengthen the assembly at its structurally weak portion; that is, across the space spanned by the thermocouple wires. The thermocouple wire elements 18' may be of standard bimetallic Nichrome and constantan, or equivalent structure, and are assembled to the contact members by silver soldering or any other method; all the Nichrome wires and all the constantan wires respectively being preferably attached to a common contact 17 or 18.

The outer conductor 10 may be made of Phosphor bronze, silver-coated brass, or any good electrical conductor and is preferably provided with one or more slots 21 to assist in dissipating the heat generated by the thermocouple wires 18'.

The entire center conductor is assembled within the outer conductor by first removing one of the spacers 13 so that one of the contacts 17 or 18 can enter the bore of the outer tubular conductor 10. When the center conductor has been inserted, spacer 13 is screwed into place with a pointed instrument which is inserted into one of the spacer plug dimples 22, provided for this purpose.

Thus, a virtually large diameter thermocouple section of center conductor is provided having a small diameter thermocouple current-measuring sensitivity.

Referring now to Figure 6 of the drawing, the electrical arrangement and behavior of the coaxial line thermocouple in connection with an indicator is schematically illustrated. Radio frequency energy is applied to the input of the thermocouple at terminals 23, the terminals being connected to inner contact member 17 and outer conductor 10, respectively. The direct current yielded in the output of the thermocouple is applied to a D. C. milliameter 25 by connecting inner contact member 18 through a radio frequency choke 24 to one terminal of said meter, the other terminal thereof being connected to outer conductor 10.

Connected in parallel electrical relation between inner contact members 17 and 18 are the plurality of identical thermocouple elements 18'. Each of elements 18' preferably consist of a Nichrome wire 18a, joined at one end by silver solder to a constantan wire 18b, the other ends of wires 18a and 18b being silver soldered to inner contact members 17 and 18, respectively. The connection between Nichrome wire 18a and constantan wire 18b serves as the hot junction of the thermocouple element, while the connections of the wires to the inner contact members 17 and 18 act as cold junctions.

In operation, the passage of radio frequency currents through each of thermocouple elements 18' sets up a D. C. potential difference between contact members 17 and 18, the respective potential differences established by the plurality of elements 18' being of substantially equal magnitude, like polarity, and in parallel relation. In consequence, a D. C. current is caused to flow in milliameter 25, thereby providing a measurement of the applied radio frequency energy. Radio frequency choke 24 is preferably of low D. C. resistance but functions as a high impedance for radio frequency currents conducted in the coaxial line so that a short-circuit of the line for alternating currents is not effected.

While the invention has been shown and described in its preferred embodiment, it is contemplated that changes in details, application and construction thereof may be made within the spirit and scope of the invention, as claimed.

Having thus described the invention, what is claimed is:

1. In a coaxial electrical conductor, an outer conductor threaded at its opposite ends to engage with coaxial line coupling elements, an inner conductor centrally disposed within the bore of said outer conductor, said inner conductor having contact members axially aligned and in spaced relation, dielectric spacer means concentrically retaining said inner conductor within the outer conductor and being threadedly assembled to said inner conductor to facilitate assembly and disassembly of the inner conductor with respect to the outer conductor, and a plurality of parallel, circumferentially-spaced thermocouples connected between said contact members to form a linear section of said inner conductor whereby said inner conductor has a small thermal capacity mass for thermocouple current measuring and a correct impedance virtual mass to match the impedance of the coaxial conductor of which it forms a part.

2. In a coaxial electrical conductor line, an outer conductor having connector sections for connecting to a coaxial conductor line and an inner conductor dielectrically disposed therein with respect to said outer conductor, said inner conductor comprising a plurality of parallel thermocouples and a pair of contact-forming retainers, each of said thermocouples having its two dissimilar portions serially connected between said retainers, each of said retainers being substantially larger in diameter than the diameter of said thermocouple portions and being peripherally slotted for securing said portions whereby said retainers form a continuous electrical conductor having a thermocouple center section, the outer diametrical conductor having a thermocouple center section, the outer diametrical cross-section of said center section being greater than the diametrical cross-section of any one of said thermocouple portions, whereby skin-current flow will be along the outside of said thermocouple portions thereby providing a low impedance ratio while maintaining high current sensitivity.

PAUL J. OVREBO.

REFERENCES CITED

The following references are of record in the file of this patent:

UNITED STATES PATENTS

| Number | Name | Date |
|---|---|---|
| 706,599 | Rosati | Aug. 12, 1902 |
| 1,502,550 | Chamberlain | July 22, 1924 |
| 1,638,894 | Todd | Aug. 16, 1927 |
| 1,905,353 | Potter | Apr. 25, 1933 |
| 1,929,878 | Clavier | Oct. 10, 1933 |
| 2,151,118 | King et al. | Mar. 21, 1939 |
| 2,273,135 | Ohnesorge et al. | Feb. 17, 1942 |
| 2,344,641 | Rosencrans | Mar. 21, 1944 |
| 2,365,207 | Moles | Dec. 19, 1944 |
| 2,410,707 | Bradley et al. | Nov. 5, 1946 |
| 2,423,447 | Grimm | July 8, 1947 |

OTHER REFERENCES

Kipp et al., Instruments, Aug., 1931, page 472 Q 184159.

Dallas et al., C. A. A. Tech. Div. Dept. No. 33, Sept., 1943, pages 10 and 67.

Certificate of Correction

Patent No. 2,468,775.     May 3, 1949.

PAUL J. OVREBO

It is hereby certified that error appears in the printed specification of the above numbered patent requiring correction as follows:

Column 4, lines 69 and 70, claim 2, strike out "conductor having a thermocouple center section, the outer diametrical";

and that the said Letters Patent should be read with this correction therein that the same may conform to the record of the case in the Patent Office.

Signed and sealed this 15th day of November, A. D. 1949.

[SEAL]

THOMAS F. MURPHY,
*Assistant Commissioner of Patents.*